(12) United States Patent
Komatsu et al.

(10) Patent No.: US 12,174,620 B2
(45) Date of Patent: Dec. 24, 2024

(54) INFORMATION PRESENTATION METHOD OF AN IDENTIFIER MANAGED BY A WELDING SYSTEM

(71) Applicant: Panasonic Intellectual Property Management Co., Ltd., Osaka (JP)

(72) Inventors: Takamichi Komatsu, Osaka (JP); Toshinari Mohri, Osaka (JP); Kazuki Hanada, Osaka (JP); Kazuyuki Nakashima, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 315 days.

(21) Appl. No.: 17/716,180

(22) Filed: Apr. 8, 2022

(65) Prior Publication Data

US 2022/0229421 A1    Jul. 21, 2022

Related U.S. Application Data

(63) Continuation of application No. PCT/JP2020/037363, filed on Sep. 30, 2020.

(30) Foreign Application Priority Data

Oct. 11, 2019  (JP) .................... 2019-188155

(51) Int. Cl.
*G05B 19/418* (2006.01)
*B23K 9/095* (2006.01)

(52) U.S. Cl.
CPC .......... *G05B 19/4184* (2013.01); *B23K 9/095* (2013.01); *G05B 19/4183* (2013.01); *G05B 19/4187* (2013.01)

(58) Field of Classification Search
CPC ............ G05B 19/4183; G05B 19/4184; G05B 19/4187; B23K 9/095
See application file for complete search history.

(56) References Cited

U.S. PATENT DOCUMENTS

2014/0048524 A1* 2/2014 Ash ........................ B23K 35/00
                                                             219/136
2014/0195031 A1* 7/2014 Couse ................ G05B 19/4183
                                                             700/115

(Continued)

FOREIGN PATENT DOCUMENTS

CN    107000100    8/2017
CN    110072660    7/2019

(Continued)

OTHER PUBLICATIONS

International Search Report issued Nov. 10, 2020 in International (PCT) Application No. PCT/JP2020/037363 with English translation.

(Continued)

*Primary Examiner* — Nicholas Klicos
(74) *Attorney, Agent, or Firm* — WENDEROTH, LIND & PONACK, L.L.P.

(57) ABSTRACT

An information presentation method is an information presentation method of an identifier managed by a welding system. The information presentation method includes: selecting, from information on identifiers assigned to a plurality of original workpieces, information on an identifier of a welded workpiece to be produced by a welding process using the plurality of original workpieces; and after the selecting, outputting an alert in a case in which, among identification signs on which information on identifiers arranged in the plurality of original workpieces are readable, an identification sign corresponding to an identifier that has not been selected is read by a reading device, and presenting (Continued)

the information on the identifier that has been selected in a case in which an identification sign corresponding to the identifier that has been selected is read by the reading device.

6 Claims, 6 Drawing Sheets

(56) References Cited

U.S. PATENT DOCUMENTS

| | | | |
|---|---|---|---|
| 2014/0263227 A1* | 9/2014 | Daniel | B23K 9/1043 219/130.01 |
| 2015/0122781 A1 | 5/2015 | Albrecht | |
| 2015/0177731 A1* | 6/2015 | Mader | G05B 19/402 700/114 |
| 2015/0254961 A1* | 9/2015 | Brandl | G08B 21/185 340/663 |
| 2016/0039034 A1 | 2/2016 | Becker et al. | |
| 2016/0243640 A1 | 8/2016 | Albrecht | |
| 2017/0036288 A1 | 2/2017 | Albrecht et al. | |
| 2017/0153616 A1 | 6/2017 | Sakakibara et al. | |
| 2019/0196442 A1 | 6/2019 | Ezawa | |
| 2021/0209431 A1* | 7/2021 | Aberl | G06K 19/025 |

FOREIGN PATENT DOCUMENTS

| | | |
|---|---|---|
| JP | 2008-059116 | 3/2008 |
| JP | 2012-048517 | 3/2012 |
| JP | 2017-021563 | 1/2017 |
| JP | 2017-102548 | 6/2017 |
| JP | 2019-063840 | 4/2019 |
| JP | 2019-117627 | 7/2019 |

OTHER PUBLICATIONS

Written Opinion of the International Searching Authority issued Nov. 10, 2020 in International (PCT) Application No. PCT/JP2020/037363.

Office Action issued Feb. 8, 2024 in corresponding Indian Patent Application No. 202247021093.

Wang Yankai, "Design and Development of Conveying System for Body In White Flexible Welding Workshop", China Academic Journal Electronic Publishing House, "Chinese Excellent Master's Thesis Full Text Database (Engineering Science and Technology II)", Issue 4, pp. 1-4, Published: Apr. 2019.

* cited by examiner

FIG. 4

| SELECTION ID | MANAGEMENT ID |
|---|---|
| AAA001 | RX85 - 100 1 |
| BBB001 | RX85 - 100 2 |
| DD D001 | RX90 - 000 1 |
| ⋮ | ⋮ |

XTB1

INFORMATION PRESENTATION METHOD OF AN IDENTIFIER MANAGED BY A WELDING SYSTEM

CROSS-REFERENCE TO RELATED APPLICATIONS

This application is a continuation of PCT International Patent Application No. PCT/JP2020/037363 filed on Sep. 30, 2020, which claims the benefit of priority of Japanese Patent Application No. 2019-188155 filed on Oct. 11, 2019, the entire contents of which are incorporated herein by reference.

FIELD

The present disclosure relates to an information presentation method.

BACKGROUND

JP-A-2017-102548 discloses a production management device that manages production performance information on a manufacturing line in which a plurality of manufacturing machines are arranged. The production management device detects which manufacturing machine a workpiece supplied to the manufacturing line is located in, generates an identifier unique to the workpiece when it is detected that the workpiece is located in any manufacturing machine, notifies the manufacturing machine in which the workpiece is located, and receives and records the generated identifier and the production performance information at the time of processing the workpiece corresponding to the identifier from the manufacturing machine. Each time the workpiece is sequentially moved to each of a plurality of manufacturing machines, the production management device records a plurality of identifiers generated for the workpiece and identifiers of products completed by the workpiece in association with each other.

SUMMARY

The present disclosure provides an information presentation method that supports more efficient management of an identifier of a workpiece produced in a process such as welding, an identification sign assignment device, and a weldment.

The present disclosure provides an information presentation method of an identifier managed by a welding system, the information presentation method including: selecting, from information on identifiers assigned to a plurality of original workpieces, information on an identifier of a welded workpiece to be produced by a welding process using the plurality of original workpieces; and after the selecting, outputting an alert in a case in which, among identification signs on which information on identifiers arranged in the plurality of original workpieces are readable, an identification sign corresponding to an identifier that has not been selected is read by a reading device, and presenting the information on the identifier that has been selected in a case in which an identification sign corresponding to the identifier that has been selected is read by the reading device.

According to the present disclosure, it is possible to support more efficient management of an identifier of a workpiece produced in a process such as welding.

BRIEF DESCRIPTION OF DRAWINGS

FIG. 4 is a diagram showing an example of a correspondence table between selected IDs and management IDs.

DETAILED DESCRIPTION

Introduction to Present Disclosure

According to JP-A-2017-102548, a production management device can manage traceability data for each workpiece. However, in the configuration of JP-A-2017-102548, different identifiers are newly assigned each time the same workpiece is located in a plurality of different production machines. In other words, each time one workpiece is sequentially located on another production machine in a production line, the one workpiece has a plurality of different identifiers. Therefore, for example, when a plurality of workpieces are joined and another workpiece is produced as in a welding process, if a new identifier is assigned to the produced workpiece in accordance with JP-A-2017-102548, a relationship between an identifier of the workpiece used in the welding process and an identifier of the produced workpiece may be complicated, and thus it may be difficult to use traceability related to the produced workpiece. That is, management of the identifier of the workpiece is complicated, and work efficiency of a system administrator is deteriorated.

Therefore, in the following embodiments, examples of an information presentation method that supports more efficient management of the identifier of the workpiece produced in a process such as welding will be described.

Hereinafter, embodiments specifically disclosing an information presentation method according to the present disclosure will be described in detail with reference to the drawings as appropriate. However, an unnecessarily detailed description may be omitted. For example, a detailed description of a well-known matter or a repeated description of substantially the same configuration may be omitted. This is to avoid unnecessary redundancy in the following description and to facilitate understanding of those skilled in the art. It should be noted that the accompanying drawings and the following description are provided to enable those skilled in the art to fully understand the present disclosure, and are not intended to limit the range of the claims.

First Embodiment

The welding system according to the first embodiment acquires information on identifiers of a plurality of original workpieces, and selects an identifier to be adopted as an identifier of a produced welded workpiece according to a predetermined rule based on completion of execution of a welding process using the plurality of original workpieces. The welding system sets the selected identifier as the identifier of the welded workpiece produced in the welding process. Hereinafter, the workpiece used in the welding process is defined as an "original workpiece", and the workpiece produced in the welding process is defined as a "welded workpiece". The "welded workpiece" may be referred to as a "secondary workpiece" or an "n-th workpiece" (n: an integer of 2 or more).

Configuration of Welding System

Figure 1:
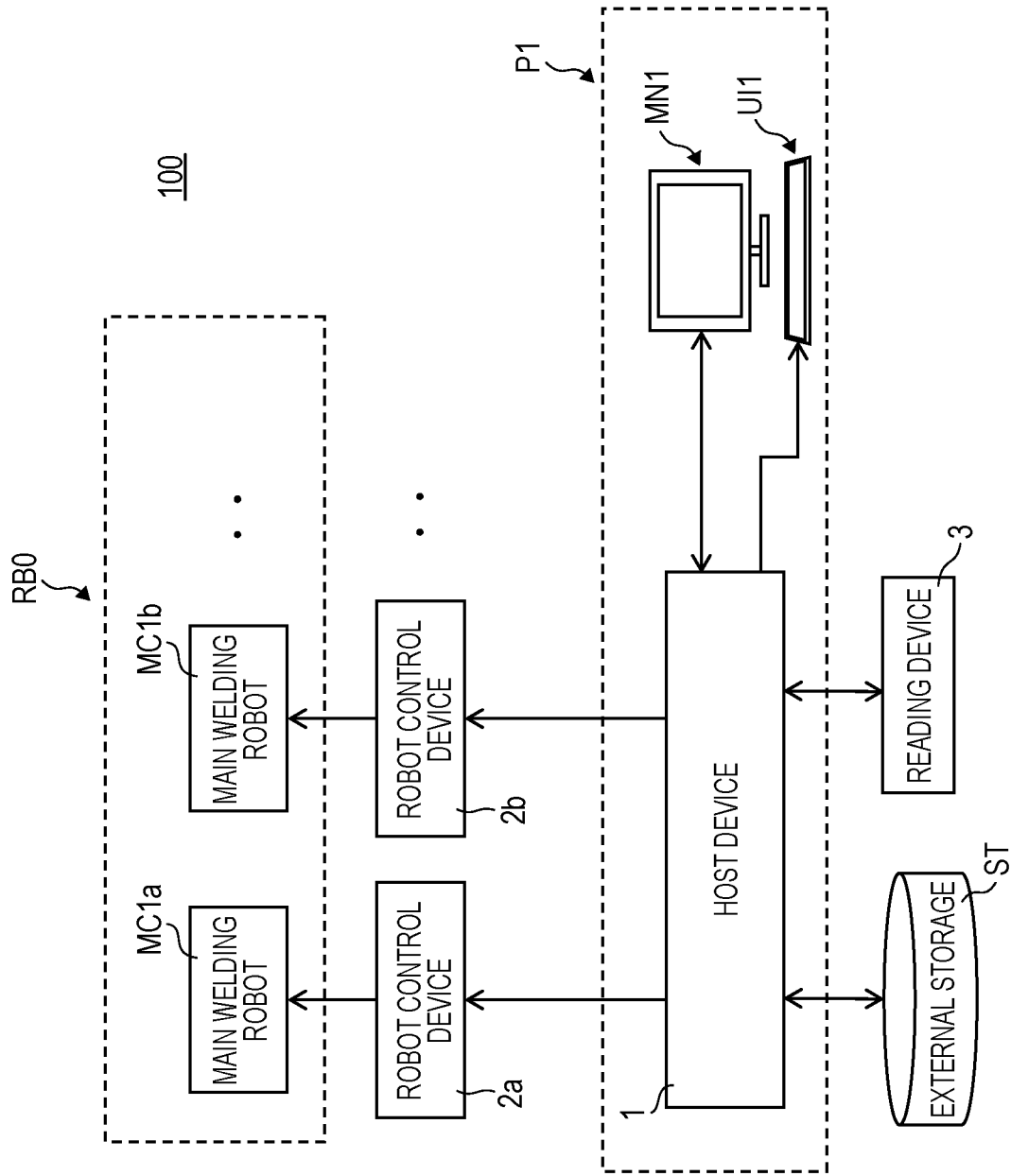
FIG. 1 is a schematic diagram showing a system configuration example of a welding system.

FIG. 1 is a schematic diagram showing a system configuration example of a welding system 100. The welding system 100 includes a host device 1 connected to each of an external storage ST, an input interface UI1, and a monitor MN1, a plurality of robot control devices (for example, robot control devices 2a and 2b), a plurality of main welding robots (for example, main welding robots MC1a and MC1b), and a reading device 3. The robot control device 2a is provided corresponding to the main welding robot MC1a, the robot control device 2b is provided corresponding to the main welding robot MC1b, and the same number of robot control devices are similarly provided corresponding to one main welding robot.

The host device 1 integrally controls the execution of the main welding (so-called welding process) executed by the corresponding main welding robots MC1a, MC1b, and so on via each of the plurality of robot control devices 2a, 2b, and so on. For example, the host device 1 reads, from the external storage ST, welding-related information input or set in advance by the user business operator (for example, a welding operator or a system administrator. The same applies hereinafter.), generates a welding process execution command including a part of contents of the welding-related information based on the welding-related information, and transmits the generated execution command to the corresponding robot control device (for example, the robot control device 2a). The execution command of the main welding described above is not limited to being generated by the host device 1, and may be generated by, for example, an operation panel (for example, a programmable logic controller (PLC)) of equipment in a factory or the like in which the main welding is performed, or an operation panel (for example, a teach Pendant (TP)) of the robot control devices 2a, 2b, and so on. The teach pendant (TP) is a device for operating the main welding robots MC1a, MC1b, and so on connected to the robot control devices 2a, 2b, and so on.

Here, the welding-related information is information indicating the content of the welding process executed for each main welding robot, and is created in advance for each welding process and registered in the external storage ST. The welding-related information includes, for example, the number of original workpieces required for the welding process, an identifier (hereinafter, abbreviated as "ID") of the original workpiece used in the welding process, a name and workpiece information, an execution scheduled date on which the welding process is scheduled to be executed, the number of welded workpieces, and various welding conditions at the time of the welding process. The welding-related information is not limited to data of items described above. The robot control device (for example, the robot control device 2a) causes the main welding robot (for example, the main welding robot MC1a) to perform the welding process using the plurality of original workpieces designated by the execution command based on the execution command transmitted from the host device 1. In the present specification, the type of the welding process is not limited, but in order to make the description easy to understand, a process of joining each of the plurality of original workpieces will be described as an example (see FIG. 3).

The host device 1 is connected to the monitor MN1, the input interface UI1, the reading device 3, and the external storage ST so as to be able to input and output data, and is further connected to each of the plurality of robot control devices 2a, 2b, and so on so as to be able to communicate data. The host device 1 may include a terminal device P1 integrally including the monitor MN1 and the input interface UI1, and may further integrally include the external storage ST. In this case, the terminal device P1 is a personal computer (PC) used by a user business operator prior to execution of a welding process (for example, main welding). The terminal device P1 is not limited to the PC described above, and may be a computer device having a communication function, such as a smartphone or a tablet terminal.

The host device 1 acquires the above-described welding-related information from the external storage ST, generates the welding process execution command using the plurality of original workpieces based on the welding-related information, and transmits the execution command to the corresponding robot control devices 2a, 2b, and so on. When the host device 1 is notified of the completion of the welding process from the corresponding robot control devices 2a, 2b, and so on after the completion of the welding process by each of the main welding robots MC1a, MC1b, and so on, the host device 1 sets the ID of a welded workpiece (for example, a secondary workpiece) produced by the welding process to an ID selected in advance according to a predetermined rule.

The host device 1 sets the ID selected as the ID of the welded workpiece as the ID of the welded workpiece, and sets the identification sign on which the selected ID is readable as the identification sign on which the ID of the welded workpiece is readable. On the other hand, the host device 1 sets an identification sign on which an unselected ID can be read as an identification sign on which the ID of the welded workpiece cannot be read. When the information on the identification sign received from the reading device 3 is an identification sign on which the ID of the welded workpiece cannot be read, the host device 1 generates and transmits an alert indicating that the identification sign is not an identification sign for reading the ID of the welded workpiece (that is, the ID of the welded workpiece is unreadable).

Here, the identification sign is an identification sign on which the ID set for the original workpiece or the welded workpiece is readable, and is, for example, a two-dimensional barcode, a QR code (registered trademark), a barcode, an IC tag, or an RF tag. The identification sign may be directly assigned (that is, marked) to the original workpiece by a laser, or may be assigned by attaching the IC tag or the RF tag.

Here, the alert is generated including notification information indicating that the identification sign is not an identification sign for reading the ID of the welded workpiece (that is, the identification sign is an identification sign on which the ID of the welded workpiece cannot be read). The alert may include, as other notification information, position information on the identification sign on which the ID of the welded workpiece is readable, or, when a plurality of welding processes are performed, information indicating that the read identification sign cannot be read by performing a welding process in the future.

Further, the host device 1 generates welding process logical data (see FIG. 3) corresponding to the set welded workpiece, associates information on an identification sign which is assigned to each original workpiece and on which information on an ID set for the original workpiece can be read with the ID set for the original workpiece, and stores the information and the ID in the external storage ST. Further, when the ID is set for the welded workpiece, the host device 1 stores the ID of the welded workpiece and the welding process logical data in the external storage ST in association with the information on the identification signs of the plurality of original workpieces. The information (data) stored in association with the identification sign is not limited to the information on the ID set for the plurality of original workpieces or welded workpieces and the welding process logical data, and may include, for example, welding-related information stored in association with the ID, and a management ID (see FIG. 4). Accordingly, the host device 1 can appropriately manage the IDs of the welded workpieces produced by the welding process by various main welding robots, and can similarly manage the IDs of the plurality of original workpieces used for producing the welded workpieces. Details of an operation of the host device 1 will be described later with reference to the drawings. The host device 1 may display the welding process logical data including the ID of the welded workpiece on the monitor MN1.

The host device 1 receives information on the identification sign read by the reading device 3 from the reading device 3 capable of reading the identification sign arranged for each of the workpiece. Based on the received information on the identification sign, the host device 1 acquires information on the ID set for the plurality of original workpieces or the welded workpiece read by the reading device 3 from the external storage ST, and transmits the information to the reading device 3. Here, the information acquired by the host device 1 is not limited to the information on the IDs set for the plurality of original workpieces or welded workpieces, and may include, for example, welding-related information, welding process logical data, and management IDs (see FIG. 6) stored in association with the IDs.

The monitor MN1 may be configured with a display device such as a liquid crystal display (LED) or an organic electroluminescence (EL). The monitor MN1 may display, for example, a screen indicating the welding process logical data including the ID of the welded workpiece, which is output from the host device 1. Instead of the monitor MN1 or together with the monitor MN1, a speaker (not shown) may be connected to the host device 1, and the host device 1 may output the ID included in the welding process logical data by voice via the speaker.

The input interface UI1 is a user interface that detects an input operation of the user business operator and outputs the input operation to the host device 1, and may be configured using, for example, a mouse, a keyboard, or a touch panel. The input interface UI1 receives, for example, an input operation when the user business operator creates the welding-related information, or an input operation when a welding process execution command is transmitted to the robot control device 2a.

The reading device 3 is a device that reads the identification sign assigned to each workpiece and outputs information on the ID set for the original workpiece or the welded workpiece, and may include, for example, a camera, a charge coupled device (CCD) sensor, or a laser. The reading device 3 may be a terminal device capable of reading the identification sign by the operation of the user business operator, or may be a device that is provided in a robot that executes the welding process or a robot that executes an inspection of the welding portion and is capable of reading the identification sign based on a control command of the host device 1 before and after the welding process or the inspection process. The reading device 3 transmits the information on the read identification sign to the host device 1. The reading device 3 displays (outputs) the ID of the original workpiece or the welded workpiece received from the host device 1 and an alert indicating that the identification sign is not an identification sign for reading the ID of the welded workpiece (that is, the ID of the welded workpiece is unreadable). The reading device 3 may output the ID of the original workpiece or the welded workpiece or the alert by voice. The reading device 3 may output the alert by lighting, blinking, or lighting color of an illumination unit (not shown), or may output the alert by vibration.

The external storage ST is configured using, for example, a hard disk drive (HDD) or a solid state drive (SSD). The external storage ST stores, for example, information on the identification sign arranged on each workpiece, data of welding-related information created for each welding process, and welding process logical data (see FIG. 3) including the ID of the welded workpiece produced by the welding process.

The robot control devices 2a, 2b, and so on are connected so as to be able to communicate data with the host device 1, and are connected so as to be able to communicate data with each of the main welding robots MC1a, MC1b, and so on. When the robot control devices 2a, 2b, and so on receive the welding process execution command sent from the host device 1, the robot control devices 2a, 2b, and so on control the corresponding main welding robots MC1a, MC1b, and so on based on the execution command to execute the welding process. When detecting the completion of the welding process, the robot control devices 2a, 2b, and so on generate a welding completion notification indicating the completion of the welding process and transmit the welding completion notification to the host device 1. Accordingly, the host device 1 can appropriately detect the completion of the welding process based on each of the robot control devices 2a, 2b, and so on. The method of detecting the completion of the welding process by the robot control devices 2a, 2b, and so on may be a method of determining the completion of the welding process based on a signal indicating the completion of the welding process from a sensor (not shown) included in, for example, a wire feeding device 300, or may be a known method, and a content of the method of detecting the completion of the welding process is not limited.

The main welding robots MC1a, MC1b, and so on as an example of the welding robot are connected to the robot control devices 2a, 2b, and so on so as to be able to communicate data with the robot control devices 2a, 2b, and so on. The main welding robots MC1a, MC1b, and so on execute the welding process instructed by the host device 1 under the control of the corresponding robot control devices 2a, 2b, and so on.

Figure 2:
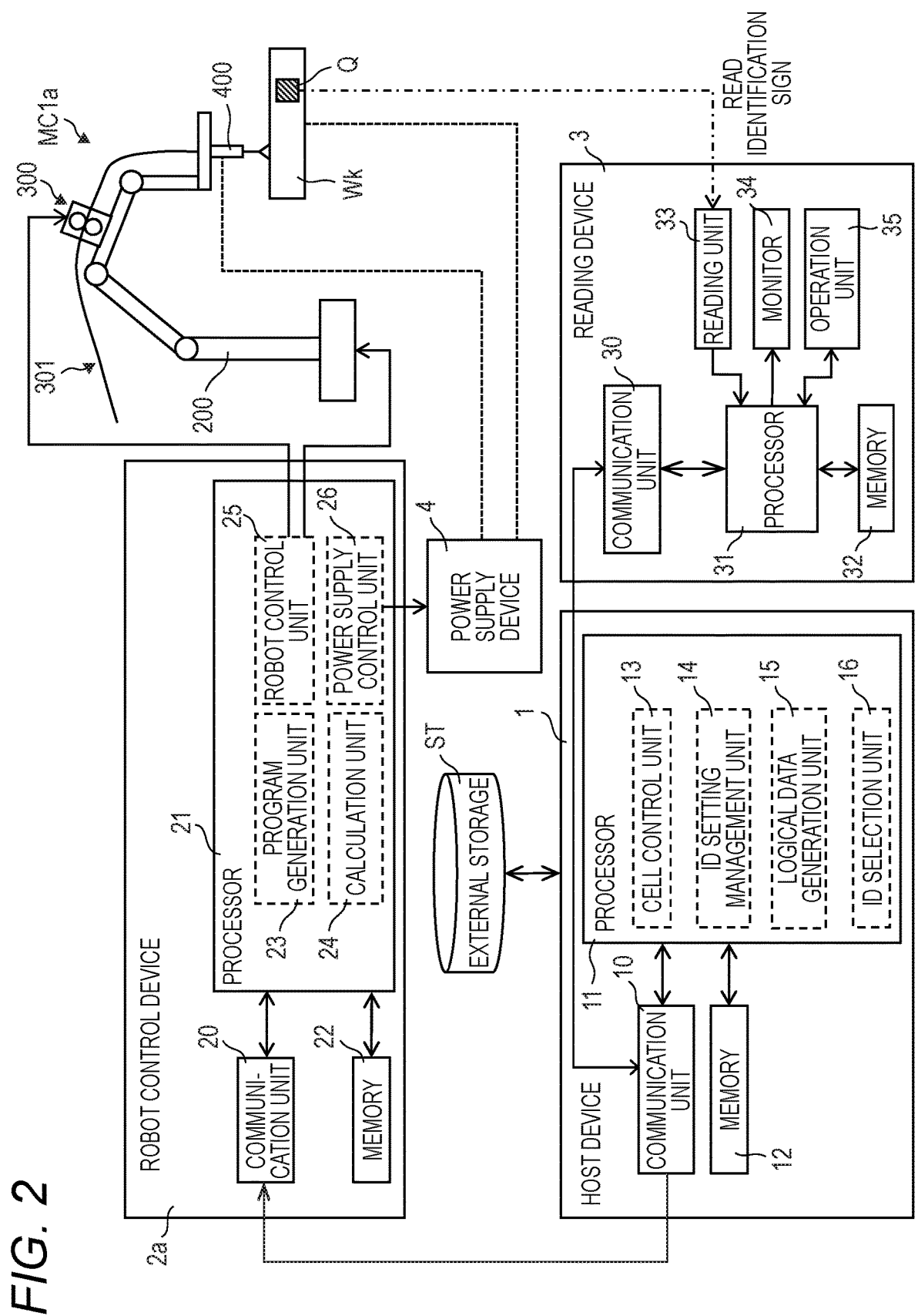
FIG. 2 is a diagram showing an internal configuration example of the host device, a robot control device, and a reading device according to the first embodiment.

FIG. 2 is a diagram showing an internal configuration example of the host device 1, the robot control device 2a, and the reading device 3 according to the first embodiment. In order to make the description easy to understand, the monitor MN1 and the input interface UI1 are not shown in FIG. 2, the main welding robot MC1a among the main welding robots MC1a, MC1b, and so on is exemplified, and further, the robot control device 2a among the robot control devices 2a, 2b, and so on is exemplified.

The main welding robot MC1a executes the welding process instructed from the host device 1 under the control of the robot control device 2a. The main welding robot MC1a performs, for example, arc welding in the welding process. However, the main welding robot MC1a may perform welding (for example, laser welding) other than the arc welding. In this case, although not shown, a laser head may be connected to a laser oscillator via an optical fiber instead of a welding torch 400. The main welding robot MC1a includes at least a manipulator 200, the wire feeding device 300, a welding wire 301, and the welding torch 400.

The manipulator 200 includes an articulated arm, and moves each arm based on a control signal from a robot control unit 25 (see the following description) of the robot control device 2a. Accordingly, the manipulator 200 can change a positional relationship between a workpiece Wk and the welding torch 400 (for example, an angle of the welding torch 400 with respect to the workpiece Wk) by the movement of the arm.

The wire feeding device 300 controls a feeding speed of the welding wire 301 based on a control signal (see the following description) from the robot control device 2a. The wire feeding device 300 may include a sensor capable of detecting a remaining amount of the welding wire 301.

The welding wire 301 is held by the welding torch 400. When electric power is supplied from a power supply device 4 to the welding torch 400, an arc is generated between a tip end of the welding wire 301 and the workpiece Wk, and the arc welding is performed. The illustration and description of a configuration and the like for supplying shielding gas to the welding torch 400 are omitted for the convenience of description.

The host device 1 generates the welding process execution command using each of the plurality of original workpieces by using the welding-related information input or set in advance by the user business operator, and transmits the execution command to the robot control device 2a. The host device 1 includes at least a communication unit 10, a processor 11, and a memory 12.

The communication unit 10 is connected to the robot control device 2 and the external storage ST so that data can be communicated among the communication unit 10, the robot control device 2a, and the external storage ST. The communication unit 10 transmits a welding process execution command (see the above description) generated by the processor 11 to the robot control device 2a. The welding process execution command may include, for example, a control signal for controlling each of the manipulator 200, the wire feeding device 300, and the power supply device 4 included in the main welding robot MC1a.

The processor 11 is configured using, for example, a central processing unit (CPU) or a field programmable gate array (FPGA), and performs various processing and control in cooperation with the memory 12. Specifically, the processor 11 functionally implements a cell control unit 13, an ID setting management unit 14, a logical data generation unit 15, and an ID selection unit 16 by referring to a program held in the memory 12 and executing the program.

The memory 12 includes, for example, a random access memory (RAM) as a workpiece memory used when processing of the processor 11 is executed, and a read only memory (ROM) for storing a program defining processing of the processor 11. The RAM temporarily stores data generated or acquired by the processor 11. A program that defines processing of the processor 11 is written into the ROM. The memory 12 stores the data of the welding-related information read from the external storage ST, data of secondary workpiece information (see the following description) including the ID of the selected welded workpiece (secondary workpiece), and the welding process logical data (see FIG. 3) of the secondary workpiece generated by the processor 11.

The cell control unit 13 generates the execution command for executing the welding process using the plurality of original workpieces defined (in other words, set) in the welding-related information based on the welding-related information stored in the external storage ST. The cell control unit 13 may generate a different welding process execution command for each welding process executed by each of the main welding robots MC1a, MC1b, and so on. The welding process execution command generated by the cell control unit 13 is transmitted to the corresponding robot control devices 2a, 2b, and so on via the communication unit 10.

The ID setting management unit 14 receives information on the ID selected as the ID of the welded workpiece (secondary workpiece) produced in the welding process from the ID selection unit 16. Furthermore, when the ID setting management unit 14 receives a notification of completion of the welding process from the robot control devices 2a, 2b, and so on, the ID setting management unit 14 sets the selected ID as the ID of the welded workpiece (secondary workpiece), sets the identification sign Q on which the unselected ID can be read as the identification sign Q on which the ID of the welding workpiece (secondary workpiece) cannot be read, and stores the identification sign Q in the memory 12. The ID setting management unit 14 may store the ID of the welded workpiece (secondary workpiece) and the welding process logical data (see the following description) in the external storage ST in association with the information on the identification sign Q.

Figure 3:
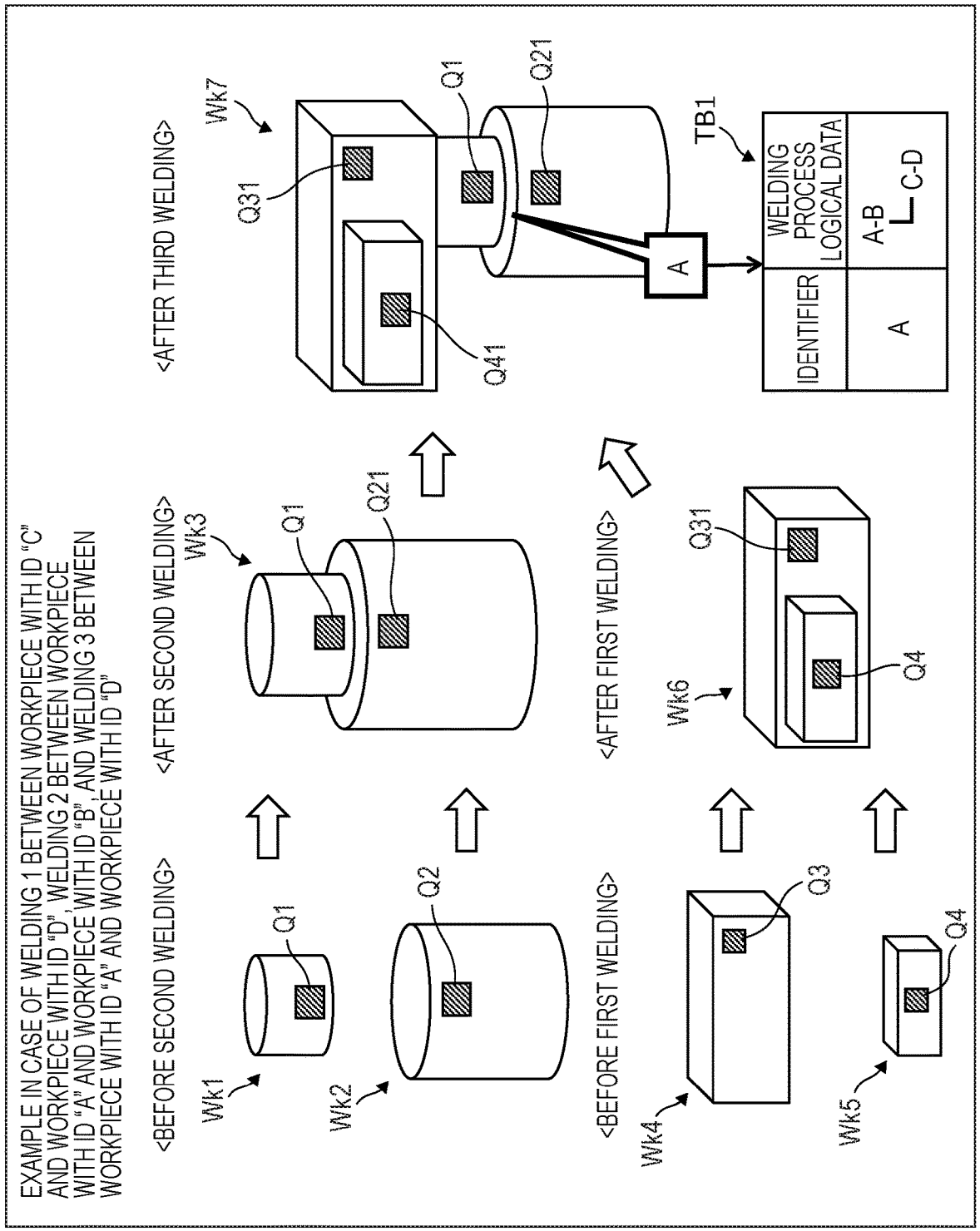
FIG. 3 explanatory diagram showing an example of an operation outline at the time of welding using a workpiece with an ID "A", a workpiece with an ID "B", a workpiece with an ID "C", and a workpiece with an ID "D".

The logical data generation unit 15 uses the secondary workpiece information including the notification of completion of welding of the welded workpiece (secondary workpiece) transmitted from the robot control device (for example, the robot control device 2a) to generate the welding process logical data indicating a relationship between the ID of the secondary workpiece and the ID of each of the plurality of original workpieces used in the welding process (for example, a temporal order in which the welding process is performed on each of the plurality of original workpieces) (see FIG. 3). Details of the welding process logical data will be described later with reference to FIG. 3. The logical data generation unit 15 may store the ID of the welded workpiece (secondary workpiece) and the welding process logical data (see FIG. 3) in the external storage ST in association with the information on the identification sign Q.

The ID selection unit 16 selects, as an ID of a welded workpiece to be produced by a predetermined welding process, any one ID among IDs of the plurality of original workpieces to be used for production of the welded workpiece according to a predetermined rule. Here, the ID and the predetermined rule will be described. In the present specification, the predetermined rule used for selection of the ID may be a rule for selection based on the ID strength (that is, the ID is strong and the ID is weak), a rule for randomly selecting any one of the plurality of original workpieces used for production of the welded workpiece, a rule for selecting the IDs of the workpiece and the workpiece having a small influence (for example, heat) due to the execution of the welding process based on the welding-related information, a rule for selecting the IDs of the workpiece and the workpiece in which the identification sign Q is easily read in the welded workpiece (so-called weldment) produced for each welding process, or the like, and any rule may be selected by the user business operator. The ID selection unit 16 stores, in the memory 12, the ID of the original workpiece selected as the ID of the welded workpiece and the ID of the original workpiece unselected as the ID of the welded workpiece for each welding process.

In the present specification, the ID is constituted by, for example, a combination of a plurality of types of character codes. The types are, for example, alphabets and numbers, and are not limited thereto. For example, "ABC001XYZ999" is indicated as the ID of the original workpiece. Here, in order to make the description easy to understand, the ID is shown as a 12-digit character code formed of "three digits of alphabets", "three digits of numerals", "three digits of alphabets", and "three digits of numerals", whereas the ID is not limited to the configuration examples. Among the 12-digit character codes, for example, the upper three digits of alphabets may indicate codes of a company or a customer (for example, a supplier or a shipping destination), and other "three digits of numerals", "three digits of alphabets", and "three digits of numerals" may indicate serial numbers. The numbers of digits of numbers and alphabets are not limited to the same number of digits, and for example, different numbers of digits such as "TA001" and "RA001" shown in FIG. 4 may be set. Hereinafter, among the rules for selecting the ID of the welded workpiece, the rule to be selected based on the ID strength and the rule for randomly selecting the ID will be described.

A rule for selecting the ID of the welded workpiece (secondary workpiece) according to ID strength will be described. As for the ID, the following two strength rules are defined as rules indicating the ID strength (that is, the ID is strong and the ID is weak). Hereinafter, the two strength rules will be described.

In a first strength rule, the ID selection unit 16 sets a division between an alphabet and a number for the ID of the original workpiece, and compares the strength of each part of the division. In a second strength rule, the ID selection unit 16 determines that, in one division between the alphabet or the number, the strength is stronger as the order of the alphabets is earlier and the strength is stronger as the number is larger. For example, it is determined that "A" is stronger than "B" in the alphabet and "2" is stronger than "1" in the number.

As a modification of the second strength rule, the ID selection unit 27 may determine that, in one division between the alphabet or the number, the strength is stronger as the order of the alphabets is later and the strength is stronger as the number is smaller. For example, it may be determined that "B" is stronger than "A" in the alphabet and "1" is stronger than "2" in the number.

Here, "ABC001XYZ999" and "ABD002XYW998" are shown as the IDs of the original workpieces to be compared. For example, the ID selection unit 16 provides divisions "ABC", "001", "XYZ", and "999" for the ID "ABC001XYZ999", and similarly provides divisions "ABD", "002", "XYW", and "998" for the ID "ABD002XYW998".

For example, the ID selection unit 16 compares the IDs of the segment parts provided in order from upper digits of the ID at any time, and determines that "ABC" is stronger than "ABD", "001" is weaker than "002", "XYZ" is weaker than "XYW", and "999" is stronger than "998". Furthermore, the ID selection unit 16 gives priority to the one with the stronger ID in the division of the upper digits and determines that the ID as a whole is strong. This is because, for example, the "alphabet" used in the upper digit of the ID does not often define the type of the original workpiece. Therefore, the ID selection unit 16 determines that the ID "ABC001XYZ999" is stronger than the ID "ABD002XYW998". The above described strength rule is merely an example, and is not limited to the above described example, and it is needless to say that a rule for determining the ID strength may be provided.

Next, the rule for randomly selecting any of the IDs of the plurality of original workpieces and determining the selected ID as the ID of the welded workpiece (secondary workpiece) will be described. In other words, when the IDs of the plurality of original workpieces are "A" and "B" (see FIG. 3), the ID selection unit 16 randomly selects "A" or "B" as the ID of the welded workpiece (for example, the secondary workpiece). "Random" means that probability that the ID "A" is selected and probability that the ID "B" is selected at the time of selection may be equal (for example, 50% each) or may not be equal. A fact that the probabilities are not equal indicates that, for example, one of the IDs may be selected more unevenly or preferentially than other IDs.

The robot control device 2a controls the processing of the corresponding main welding robot MC1a (specifically, the manipulator 200, the wire feeding device 300, and the power supply device 4) based on the welding process execution command sent from the host device 1. The robot control device 2a includes at least a communication unit 20, a processor 21, and a memory 22.

The communication unit 20 is connected to enable data communication between the host device 1 and the main welding robot MC1a. Although illustration is simplified in FIG. 2, data is transmitted and received between the robot control unit 25 and the manipulator 200, between the robot control unit 25 and the wire feeding device 300, and between a power supply control unit 26 and the power supply device 4 via the communication unit 20. The communication unit 20 receives the welding process execution command transmitted from the host device 1. The communication unit 20 transmits the workpiece information of the welded workpiece produced by the welding process to the host device 1.

Here, the secondary workpiece information includes at least workpiece information (for example, the ID and name of the original workpiece, the welding portion of the original workpiece, etc.) including the IDs of the plurality of original workpieces used in the welding process, and welding conditions at the time of execution of the welding process. The welding conditions include, for example, a material and a thickness of the original workpiece, a material and a wire diameter of the welding wire 301, a type of the shielding gas, a flow rate of the shielding gas, a set average value of a welding current, a set average value of a welding voltage, a feeding speed and a feeding amount of the welding wire 301, the number of times of welding, and a welding time. In addition to these, for example, information indicating a type of welding process (for example, TIG welding, MAG welding, or pulse welding), and a moving speed and a moving time of the manipulator 200 may be included.

The processor 21 is configured with, for example, a CPU or an FPGA, and executes various processing and controls in cooperation with the memory 22. Specifically, the processor 21 functionally implements a program generation unit 23, a calculation unit 24, the robot control unit 25, and the power supply control unit 26 by referring to a program held in the memory 22 and executing the program.

The memory 22 includes, for example, a RAM as a workpiece memory used when the processing of the processor 21 is executed, and a ROM that stores a program defining the processing of the processor 21. The RAM temporarily stores data generated or acquired by the processor 21. The program that defines processing of the processor 21 is written in the ROM. The memory 22 stores data of the welding process execution command transmitted from the host device 1, data of information on the welded workpiece generated by the welding process, and data of welding process logical data (see FIG. 3) of the secondary workpiece generated by the processor 21. The memory 22 stores a welding process program executed by the main welding robots MC1a, MC1b, and so on. The welding process program is a program that defines a specific procedure (process) of the welding process of joining the plurality of original workpieces using the welding conditions in the welding process. The program may be created in the robot control device 2a, or may be created by the host device 1, transmitted in advance, and stored in the robot control device 2a.

The program generation unit 23 generates a welding process program to be executed by the main welding robot (for example, the main welding robot MC1a) using the workpiece information (for example, the ID, the name, and the welding portion of the original workpiece) of each of the plurality of original workpieces included in the execution command based on the welding process execution command transmitted from the host device 1 via the communication unit 20. The program may include various parameters such as the welding current, the welding voltage, an offset amount, a welding speed, and a posture of the welding torch 400 for controlling the power supply device 4, the manipulator 200, the wire feeding device 300, the welding torch 400, and the like during the execution of the welding process. The generated program may be stored in the processor 21 or may be stored in the RAM in the memory 22.

The calculation unit 24 performs various calculations. For example, the calculation unit 24 performs calculation or the like for controlling the main welding robot MC1a (specifically, each of the manipulator 200, the wire feeding device 300, and the power supply device 4) controlled by the robot control unit 25 based on a welding process program generated by the program generation unit 23.

The robot control unit 25 drives the main welding robot MC1a (specifically, each of the manipulator 200, the wire feeding device 300, and the power supply device 4) based on the welding process program generated by the program generation unit 23.

The power supply control unit 26 drives the power supply device 4 based on the welding process program generated by the program generation unit 23 and a calculation result of the calculation unit 24.

The reading device 3 reads the identification sign Q assigned to the original workpiece used for the execution of the welding process or the welded workpiece produced by the execution of the welding process, and outputs the ID of the read workpiece. The reading device 3 is used by the user business operator. The reading device 3 includes at least a communication unit 30, a processor 31, a memory 32, a reading unit 33, and an operation unit 35. A monitor 34 may or may not be included in the reading device 3. When the monitor 34 is implemented as a configuration that is not included in the reading device 3, the monitor 34 is connected to the reading device 3 so as to be capable of wireless or wired communication. The reading device 3 may include a speaker (not shown) when the reading device 3 outputs information on the ID of the workpiece or the alert by voice. The reading device 3 may include, for example, an LED (not shown) or the like, and may output the alert by lighting and blinking. Furthermore, the reading device 3 may have a vibration function, vibrate the reading device 3 using a known technique, and output the alert by vibration.

The communication unit 30 is connected to the host device 1 so as to be able to communicate data with the host device 1. The communication unit 30 transmits, to the host device 1, a command for requesting information on the ID of the workpiece to which the read identification sign Q is assigned, based on a reading result of the identification sign Q by the processor 31. The communication unit 30 receives the information on the ID of the identification sign Q or the alert indicating that the identification sign Q is the identification sign Q that cannot be read from the host device 1, and outputs the received information on the ID or the alert to the processor 31.

The processor 31 is configured with, for example, a CPU or an FPGA, and executes various processing and controls in cooperation with the memory 32. Specifically, the processor 31 implements functions of the processor 31 by referring to a program held in the memory 32 and executing the program.

The memory 32 includes, for example, a RAM as a workpiece memory used when the processing of the processor 31 is executed, and a ROM that stores a program defining the processing of the processor 31. The RAM temporarily stores data generated or acquired by the processor 31. The program that defines processing of the processor 31 is written in the ROM. Further, the memory 32 stores the information on the identification sign Q read from the reading unit 33, the ID of the workpiece associated with the information on the identification sign Q transmitted from the host device 1, and the like.

The reading unit 33 includes, for example, a camera for reading a two-dimensional barcode or a laser for reading a barcode. The reading unit 33 reads the identification sign Q assigned to the workpiece, and outputs information (data) read from the identification sign Q to the processor 31.

The reading unit 33 implemented by using the camera is capable of reading, for example, the two-dimensional barcode, and includes at least a lens (not shown) and an image sensor (not shown). The image sensor is, for example, a solid-state imaging element of a charged-coupled device (CCD) or a complementary metal oxide semiconductor (CMOS), and converts an optical image formed on an imaging surface into an electric signal. The reading unit 33 implemented by the camera captures an image of the identification sign Q and performs image analysis on the captured identification sign Q. The reading unit 33 outputs information (data) on the identification sign Q acquired as a result of the image analysis to the processor 31.

The reading unit 33 implemented by using the laser can optically read the identification sign Q (for example, the bar code, the IC tag, or the RF tag), and specifically, receives reflected light reflected by the identification sign Q by using the laser, and replaces a color included in the reflected light with a binary digital signal to acquire the information on the identification sign Q. The reading unit 33 includes a laser and a CCD reader capable of receiving the reflected light of the laser, or a laser and radio frequency identification (RFID). The reading unit 33 outputs information (data) on the barcode read by the CCD reader or information (data) on the IC tag, the RF tag, and the like read by the RFID to the processor 31. When the reading unit 33 is implemented by the RFID, the reading unit 33 can read each of a plurality of IC tags or RF tags located in a range where radio waves reach at a time.

The monitor 34 serving as an example of an output unit is configured using, for example, a liquid crystal display (LCD) or an organic electroluminescence (EL). The monitor 34 outputs the ID of the workpiece received from the host device 1 or an alert. The monitor 34 may be a touch interface configured by a touch panel. In such a case, the monitor 34 has a function as an operation unit 35, receives the input operation of the user business operator, generates a control signal based on the input operation, and outputs the control signal to the processor 31.

The operation unit 35 receives the input operation by the user business operator and outputs the input operation to the processor 31. The operation unit 35 generates the control signal based on the input operation by the user business operator and outputs the control signal to the processor 31. The operation unit 35 may be implemented as a touch panel of the monitor 34 described above.

FIG. 3 is an explanatory diagram showing an example of an operation outline at the time of welding using the workpiece Wk1 with the ID "A", the workpiece Wk2 with the ID "B", the workpiece Wk4 with the ID "C", and the workpiece Wk5 with the ID "D". In the example of FIG. 3, a rectangular parallelepiped workpiece Wk4 (original workpiece) having the ID "C" and a rectangular parallelepiped workpiece Wk5 (original workpiece) having the ID "D" are joined together in a second welding process to produce a welded workpiece (that is, a secondary workpiece Wk6), a cylindrical workpiece Wk1 (original workpiece) having the ID "A" and a cylindrical workpiece Wk2 (original workpiece) having the ID "B" are joined together in a first welding process to produce a welded workpiece (that is, a secondary workpiece Wk3), and the secondary workpiece Wk3 having the ID "A" and the secondary workpiece Wk6 having the ID "D" are joined together in a third welding process to produce a welded workpiece (that is, a tertiary workpiece Wk7). Similarly, the IDs "A", "B", "C", and "D" are formed of, for example, 12-digit alphabets and numerals, but are collectively represented by one alphabetic character in order to make the description of FIG. 3 easy to understand.

The ID selection unit 16 in FIG. 3 selects an ID to be adopted for each of the secondary workpiece Wk6, the secondary workpiece Wk3, and the tertiary workpiece Wk7 based on the ID strength rule. It is needless to say that the rule for selecting the ID is not limited thereto. In the welding system 100 according to the first embodiment, an example in which the ID selection unit 16 selects the ID before the execution of a first welding process to a third welding process is described, whereas a timing at which the ID selection is executed may be changed according to a place at which each welding process is executed, a timing at which the inspection and repair welding of an n-th workpiece are executed, and the like.

In the example shown in FIG. 3, it is assumed that the ID selection unit 16 determines that the ID "A" is stronger than the ID "B". In this case, the ID selection unit 16 adopts and selects the stronger ID "A" as it is (that is, without changing) as the ID of the welded workpiece (that is, the secondary workpiece Wk3) which is a product of the second welding process. The ID selection unit 16 outputs information on the selected ID "A" and the unselected ID "B" to the processor 31.

Based on the information on the ID "A" selected as and the ID "B" unselected as the ID of the welded workpiece (that is, secondary workpiece Wk3) received from the ID selection unit 16, and upon completion of execution of the second welding process, the processor 31 stores, in the memory 12, the identification sign Q1 on which the ID "A" of the selected workpiece Wk1 (original workpiece) is readable as the identification sign Q1 on which the ID "A" of the secondary workpiece Wk3 (welded workpiece) is readable, and stores, in the memory 12, the identification sign Q2 on which the ID "B" of the unselected workpiece Wk2 (original workpiece) is readable as an unreadable identification sign Q21.

Similarly, it is assumed that the ID selection unit 16 determines that the ID "D" is stronger than the ID "C". In this case, the ID selection unit 16 adopts and selects the stronger ID "D" as it is (that is, without changing) as the ID of the welded workpiece (that is, the secondary workpiece Wk6) which is the product of the first welding process.

Based on the information on the ID "D" selected as and the ID "C" unselected as the ID of the welded workpiece (that is, secondary workpiece Wk6) received from the ID selection unit 16, and upon the completion of execution of the first welding process, the processor 31 stores, in the memory 12, the identification sign Q4 on which the ID "D" of the selected workpiece Wk5 (original workpiece) is readable as the identification sign Q4 on which the ID "D" of the secondary workpiece Wk6 (welded workpiece) is readable, and stores, in the memory 12, the identification sign Q3 on which the ID "C" of the unselected workpiece Wk4 (original workpiece) is readable as an unreadable identification sign Q31.

Furthermore, it is assumed that the ID selection unit 16 determines that the ID "A" is stronger than the ID "D". In this case, the ID selection unit 16 adopts and selects the stronger ID "A" as it is (that is, without changing) as the ID of the welded workpiece (that is, the tertiary workpiece Wk7) which is the product of the third welding process.

Based on the information on the ID "A" selected as and the ID "D" unselected as the ID of the welded workpiece (that is, tertiary workpiece Wk7) received from the ID selection unit 16, and upon the completion of execution of the third welding process, the processor 31 stores, in the memory 12, the identification sign Q1 on which the ID "A" of the selected workpiece Wk1 (original workpiece) is readable as the identification sign Q1 on which the ID "A" of the tertiary workpiece Wk7 (welded workpiece) is readable, and stores, in the memory 12, the identification sign Q4 on which the ID "D" of the unselected workpiece Wk5 (original workpiece) is readable as an unreadable identification sign Q41.

However, if the ID "A" of the workpiece Wk1 (original workpiece), the ID "A" of the secondary workpiece Wk3 (welded workpiece), and the ID "A" of the tertiary workpiece Wk7 are all the same, when the information on a past ID read by the reading device 3 (that is, history information on the ID stored in the memory 32) is browsed or when the user manages whether the reading is executed, it may be complicated for the user business operator to determine and manage which ID "A" is the workpiece Wk1 (original workpiece), the secondary workpiece Wk3 (welded workpiece), or the tertiary workpiece Wk7. Further, in the welding system 100 according to the first embodiment, among the plurality of identification signs assigned to the secondary workpieces Wk3 and Wk6 and the tertiary workpiece Wk7 as the welded workpieces, the identification signs unselected as the IDs of the secondary workpieces Wk3 and Wk6 and the tertiary workpiece Wk7 (that is, the identification sign Q21 in the secondary workpiece Wk3 as the welded workpiece, the identification sign Q31 in the secondary workpiece Wk6 as the welded workpiece, and the plurality of identification signs Q21, Q31, and Q41 in the tertiary workpiece Wk7 as the welded workpiece) are set so as to be unable to be read after the execution of each welding process and so as to output an alert indicating that the identification signs cannot be read. Therefore, in the welding system 100 according to the first embodiment, for example, when the host device 1 receives the notification of the completion of the execution of the welding process, in the first welding process to the third welding process, the host device 1 generates the welding process logical data (see FIG. 3) logically indicating a mutual relationship between the strongest ID "A" and other weak IDs "B", "C", and "D", generates a record TB1 in which the ID "A" of the tertiary workpiece Wk7 and the welding process logical data are associated with each other, and stores the record TB1 in the external storage ST. The record is generated in the same manner for each of the secondary workpieces Wk3 and Wk6 after the execution of the first welding process and the second welding process, and is stored in the external storage ST, whereas it is omitted in the example of FIG. 3.

The welding process logical data indicates, as viewed from the ID "A" of the tertiary workpiece Wk7, which ID the original workpiece having which ID is used in which the welding process the tertiary workpiece Wk7 is used and produced, and also indicates a strength relationship of the IDs of the plurality of original workpieces used in each of the welding processes, and a temporal order in which each process is executed. For example, the welding process logical data indicates that the tertiary workpiece Wk7 having the ID "A" is produced through three welding processes (the first welding process to the third welding process). In the second welding process, the workpiece Wk1 (original workpiece) having the ID "A" and the workpiece Wk2 (original workpiece) having the ID "B" are welded to each other, and since the ID "A" is stronger than the ID "B", the ID "A" is selected as the ID of the secondary workpiece Wk3. In the first welding process, the workpiece Wk4 (original workpiece) having the ID "C" and the workpiece Wk5 (original workpiece) having the ID "D" are welded, and since the ID "D" is stronger than the ID "C", the ID "D" is selected as the ID of the secondary workpiece Wk6. In the third welding process, the secondary workpiece Wk3 having the ID "A" and the secondary workpiece Wk6 having the ID "D" are welded to each other, and since the ID "A" is strong, the ID "A" is selected as the ID of the tertiary workpiece Wk7. In the welding process logical data, when viewed from the ID "A" of the tertiary workpiece Wk7, a position closer to the ID "A" indicates that a time at which the workpiece Wk1 (original workpiece) or the secondary workpiece Wk3 of the ID "A" is welded is older, and a position farther from the ID "A" indicates that the time at which the workpiece Wk1 (original workpiece) or the secondary workpiece Wk3 of the ID "A" is welded is newer. Accordingly, even after all of the plurality of welding processes are completed, the user business operator can comprehensively grasp the data on the plurality of original workpieces used for the production of the tertiary workpiece Wk7 without losing the information on the original workpiece or the secondary workpiece of the ID that is unreadable in each welding process.

FIG. 4 is a diagram showing an example of a correspondence table XTB1 between a selection ID and a management ID. When a business operator (hereinafter, referred to as the "user business operator") who executes the welding process starts the welding process, an original workpiece such as a steel material used in the welding process may be supplied (in other words, may be outsourced) from the supplier in advance. For this reason, when the user business operator outsources the original workpiece such as the steel material, an ID is often assigned to the original workpiece in advance at an outsource destination. In the following description, the ID of the original workpiece assigned in advance in the outsource destination as described above is referred to as a "selection ID". When the supplied original workpiece is assigned a selection ID unique to the outsource destination, the use of the selection ID may not be suitable in terms of the management of the user business operator.

Therefore, as shown in FIG. 4, in the welding system 100 according to the first embodiment, when the selection ID is assigned to each of one or more original workpieces to be supplied from the outsource destination, the correspondence table XTB1 (an example of the management table) indicating a relationship between the selection ID and the management ID of the user business operator is created by the user business operator and stored in the external storage ST. The correspondence table XTB1 may be stored in the memory 12 of the host device 1.

For example, in the correspondence table XTB1 of FIG. 4, it is assumed that the user business operator supplies a plurality of original workpieces of the same type (for example, the same material supplied from the same supplier) from the outsource destination, and the management IDs "AAA001", "BBB001", "DDD001", and the like corresponding to the selection IDs "RX85-1001", "RX85-1002", "RR90-0001", and the like unique to the outsource destination are defined. "RX85-1001", "RX85-1002", "RR90-0001", and so on are of the same type because "RX85" before hyphen in the ID is common, and are different from each other in branch number of "RX85" (number after the hyphen in the ID), so that the original workpieces (parts) are different.

Operation of Welding System

Figure 5:
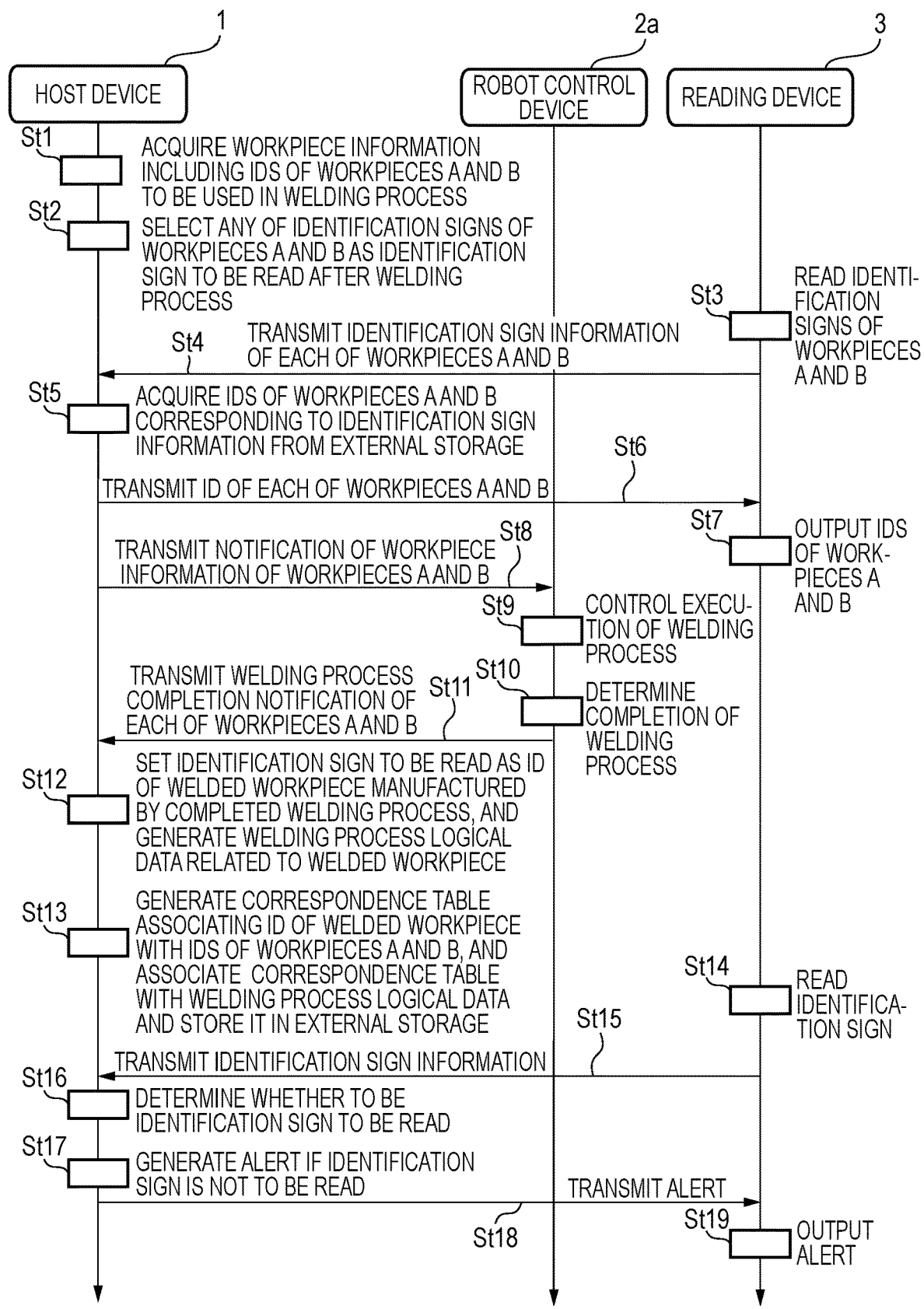
FIG. 5 is a sequence diagram showing an example of an operation procedure of ID management in the welding system according to the first embodiment.

Next, an operation procedure of the ID management by the welding system 100 according to the first embodiment will be described with reference to FIG. 5. FIG. 5 is a sequence diagram showing an operation procedure example of the ID management in the welding system 100 according to the first embodiment. In the description of FIG. 5, an operation procedure performed among the host device 1, the robot control device 2a, and the reading device 3 with respect to the second welding process using the plurality of workpieces Wk1 and Wk2 (original workpieces) shown in FIG. 3 will be described as an example, and an operation procedure performed among other robot control devices 2b will be omitted. The workpiece A shown in FIG. 5 is the workpiece Wk1 (original workpiece) having the ID "A". Similarly, the workpiece B shown in FIG. 5 is the workpiece Wk2 (original workpiece) having the ID "B".

In FIG. 5, the host device 1 acquires workpiece information (for example, the ID, the name of the workpiece, and the welding portion of the original workpiece) including IDs of the plurality of workpieces Wk1 and Wk2 (original workpieces) to be subjected to the welding process (main welding) (St1), and selects one of the IDs of the plurality of workpieces Wk1 and Wk2 (original workpieces) as the ID of the secondary workpiece Wk3 (welded workpiece) produced by the second welding process. Here, an example in which the ID "A" of the workpiece Wk1 (original workpiece) is selected as in the example shown in FIG. 3 will be described. Further, the host device 1 selects the identification sign on which the selected ID is readable as the identification sign on which the ID of the secondary workpiece Wk3 (welded workpiece) is readable (St2).

The reading device 3 reads the identification sign Q1 assigned to the plurality of workpieces Wk1 (original workpieces) used for the secondary workpiece Wk3 (welded workpiece) produced in the second welding process and the identification sign Q2 assigned to the workpiece Wk2 (original workpiece) (St3), and transmits information on each of the read identification signs Q1 and Q2 to the host device 1 (St4).

The host device 1 refers to the external storage ST based on the information on each of the identification signs Q1 and Q2 received from the reading device 3, and acquires the ID "A" associated with the information on the identification sign Q1 and the ID "B" associated with the information on the identification sign Q2 (St5). The host device 1 transmits the IDs of the acquired identification signs Q1 and Q2 to the reading device 3 (St6).

The reading device 3 outputs the IDs of the identification signs Q1 and Q2 received from the host device 1 to the monitor 34 (St7).

When the execution of the second welding process is completed, the host device 1 stores, in the memory 12, the identification sign Q1 om which the ID "A" of the selected workpiece Wk1 (original workpiece) is readable as the identification sign Q1 on which the ID "A" of the secondary workpiece Wk3 (original workpiece) is readable, and stores, in the memory 12, the identification sign Q2 on which the ID "B" of the unselected workpiece Wk2 (original workpiece) is readable as the identification sign Q21 on which the ID "B" is not readable. The host device 1 transmits a second welding process execution command including the workpiece information on the workpiece Wk1 (original workpiece) and the workpiece information on the workpiece Wk2 (original workpiece) to the robot control device 2a (St8).

When the robot control device 2a receives the welding process execution command transmitted from the host device 1, the robot control device 2a generates a second welding process program executed by the main welding robot MC1a using the workpiece information on each of the plurality of workpieces Wk1 and Wk2 (original workpieces) included in the execution command, and causes the main welding robot MC1a to execute the main welding according to the program (St9). The robot control device 2a determines the completion of the main welding (second welding process) by the main welding robot MC1a by various known methods (St10), generates a main welding completion notification indicating the completion of the main welding every time the main welding of each of the plurality of workpieces Wk1 and Wk2 (original workpieces) is completed, and transmits the notification to the host device 1 (St11).

When the main welding completion notification indicating that the main welding is completed is received from the robot control device 2a, the host device 1 sets the identification sign Q1 on which the ID "A" of the workpiece Wk1 (original workpiece) selected in the processing of step St8 is readable as the identification sign Q1 on which the ID "A" of the secondary workpiece Wk3 (original workpiece) is readable, sets the identification sign Q2 on which the ID "B" of the unselected workpiece Wk2 (original workpiece) is readable as the identification sign Q21 on which the ID "B" is not readable, and generates the welding process logical data (see FIG. 3) related to the secondary workpiece Wk3 (welded workpiece) (St12). The host device 1 generates a record TB1 in which information including the ID "A" of the secondary workpiece Wk3 (welded workpiece), the ID "B" of the unselected workpiece Wk2 (original workpiece), and the welding process logical data related to the secondary workpiece Wk3 (welded workpiece) are associated with each other, and stores the record TB1 in the external storage ST (St13).

The reading device 3 reads the identification sign Q21 assigned to the secondary workpiece Wk3 (welded workpiece) produced by the completion of the main welding (St14), and transmits information on the read identification sign Q21 to the host device 1 (St15). In FIG. 5, an example in which the identification sign Q21 on which the ID of the secondary workpiece Wk3 (welded workpiece) cannot be read is read will be described.

The host device 1 refers to the external storage ST based on the information on the identification sign Q21 received from the reading device 3, acquires the ID "B" associated with the information on the identification sign Q21 and the information on the workpiece Wk2 (original workpiece) indicated by the ID "B", and determines that the identification sign Q21 cannot be read (St16). The host device 1 may execute the determination processing of step St16 based on the information on the workpiece Wk2 (original workpiece), or may execute the determination processing of step St16 based on the acquired ID "B", the ID "B" stored in the memory 12, and the information on the workpiece Wk2 (original workpiece) indicated by the ID "B".

When it is determined that the identification sign Q21 is an identification sign that cannot be read as a result of the determination processing of step St16 (that is, the identification sign Q21 is not an identification sign read after the execution of the second welding process), the host device 1 generates an alert indicating that the identification sign Q21 is an identification sign that cannot be read (St17), and transmits the alert to the reading device 3 (St18). The alert may be generated to include the position information on the readable identification sign Q1. Accordingly, the welding system 100 according to the first embodiment can notify the user business operator that the read identification sign Q21 is an identification sign that cannot be read after the execution of the second welding process, and can also notify the user business operator of the position information on the readable identification sign Q1. Here, the position information on the identification sign Q1 may be information related to the workpiece Wk1 (original workpiece), or may be visualized by assigning a marker indicating the position of the identification sign Q1 on design data (that is, drawing) of the secondary workpiece Wk3 (welded workpiece).

Although not shown in FIG. 5, when the identification sign is determined to be a readable identification sign in the determination processing of step St16 (that is, when the identification sign Q1 is read in the processing of step St14), the host device 1 transmits information on the ID "A" of the secondary workpiece Wk3 (welded workpiece) indicated by the identification sign Q1, information on the workpiece Wk1 (original workpiece) indicated by the ID "A", information on the welding process logical data, and the like to the reading device 3. When the identification sign Q1 cannot be read in the welding process executed in the future, the host device 1 may transmit information on the welding process in which the identification sign Q1 cannot be read to the reading device 3.

The reading device 3 receives the alert transmitted from the host device 1 and outputs the alert to the monitor 34 (St19). The alert may be output by voice from a speaker (not shown). The alert may be indicated by lighting, blinking, or lighting color of an illumination (not shown) such as an LED included in the reading device 3, or may be indicated by vibration.

In FIG. 5, it is needless to say that the reading device 3 may read the identification signs of the plurality of workpieces Wk1 and Wk2 (original workpieces) before the second welding process is executed. For example, the user business operator may execute the reading of the identification sign Q2 of the workpiece Wk2 (original workpiece) in view of a fact that the identification sign Q2 of the workpiece Wk2 (original workpiece) cannot be read after the execution of the second welding process. The user business operator may read the identification sign Q1 of the workpiece Wk1 (original workpiece) and the identification sign Q2 of the workpiece Wk2 (original workpiece) before the execution of the second welding process, and may read the identification sign Q1 of the secondary workpiece Wk3 (welded workpiece) after the execution of the second welding process.

Accordingly, the welding system 100 according to the first embodiment can appropriately manage the ID of the original workpiece having the ID unselected as the ID of the welded workpiece after the execution of the welding process, and can support the reading of the identification sign on which the ID of the workpiece is readable. The welding system 100 according to the first embodiment can acquire the information on the identification sign to be read in advance by the user business operator by outputting the information on the identification sign that cannot be read in the future welding process together with the information on the welding process that cannot be read, and thus can support more efficient management of the identifier of the workpiece produced in the process such as welding. An information presentation method of outputting such an alert is useful in supporting more efficient management of the ID of the user business operator since the number of identification signs assigned to the welded workpiece increases in the welded workpiece produced by executing the plurality of welding processes.

As described above, in the information presentation method of the identifier (ID) managed by the welding system, the welding system 100 according to the first embodiment selects, from the information on the IDs assigned to the plurality of original workpieces, the information on the ID of the welded workpiece to be produced by the welding process using the plurality of original workpieces, and after the selection, outputs an alert in a case in which, among the identification signs on which the information on the IDs arranged in the plurality of original workpieces is readable, the reading device reads the identification sign corresponding to the ID that has not been selected, and presents the information on the ID that has been selected in a case in which the reading device reads the identification sign corresponding to the ID that has been selected.

Accordingly, when the identification sign is not to be read in advance by the user business operator, the welding system 100 according to the first embodiment can generate and output an alert indicating that the identification sign is not to be read, and can support more efficient management of the ID of the workpiece produced in a process such as welding. Since the user business operator can determine whether the identification sign read by the reading device 3 is a readable identification sign (that is, an identification sign to be read) based on the alert, it is easy to manage the ID of the workpiece produced in the process such as welding.

In the welding system 100 according to the first embodiment, the reading of the information on the IDs arranged on the plurality of original workpieces is performed before the execution of the welding process. Accordingly, the welding system 100 according to the first embodiment can read the IDs of the workpieces used in the welding process, and can support more efficient management of the IDs of the workpieces produced in the process such as welding based on the plurality of read IDs.

In addition, the alert output by the welding system 100 according to the first embodiment includes information in which the ID that has not been selected becomes unreadable after the welding process. Accordingly, the welding system 100 according to the first embodiment can notify the user business operator of information on the identification sign that cannot be read after the future welding process (that is, unexecuted welding process) is executed. Therefore, since the user business operator can acquire the information on the identification sign to be read in advance based on the output alert, it is possible to support more efficient management of the ID of the workpiece produced in the process such as welding. An information presentation method of outputting such an alert is useful in supporting more efficient management of the ID of the user business operator since the number of identification signs assigned to the welded workpiece increases in the welded workpiece produced by executing the plurality of welding processes.

In the welding system 100 according to the first embodiment, the reading of the information on the IDs arranged on the plurality of original workpieces is performed after the execution of the welding process. Accordingly, when the identification sign on which the ID of the produced welded workpiece cannot be read is read, the welding system 100 according to the first embodiment can notify the user business operator that the identification sign cannot be read. Therefore, the user business operator can read the readable identification sign (that is, the identification sign to be read), and can support more efficient management of the ID of the workpiece produced in the process such as welding based on the read ID of the welded workpiece.

In the welding system 100 according to the first embodiment, the alert includes information indicating that an ID that has not been selected becomes unreadable in the welding process. Accordingly, the welding system 100 according to the first embodiment can also notify the user business operator that the identification sign is an identification sign that cannot be read after the past welding process (that is, the unexecuted welding process) is executed. Therefore, the user business operator can acquire information on a timing (welding process) at which the read identification sign cannot be read based on the output alert.

In the welding system 100 according to the first embodiment, the alert includes position information on the ID that has been selected. Accordingly, the welding system 100 according to the first embodiment can notify the user business operator that the read identification sign is an identification sign that cannot be read after the execution of the welding process, and can also notify the user business operator of the position information on the readable identification sign. Therefore, the user business operator can read the identification sign on which the ID of the welded workpiece is readable based on the position information on the notified readable identification sign (that is, the identification sign to be read).

Second Embodiment

In the welding system 100 according to the first embodiment, the example in which the identification sign Q is read by the reading device 3 (that is, the example in which the ID of the workpiece is read by the reading device 3) is described. In the welding system 100 according to the second embodiment, an example will be described in which the main welding robot further includes a reading unit capable of reading information on the identification sign Q assigned to the workpiece, and the robot control device has an ID reading function.

Figure 6:
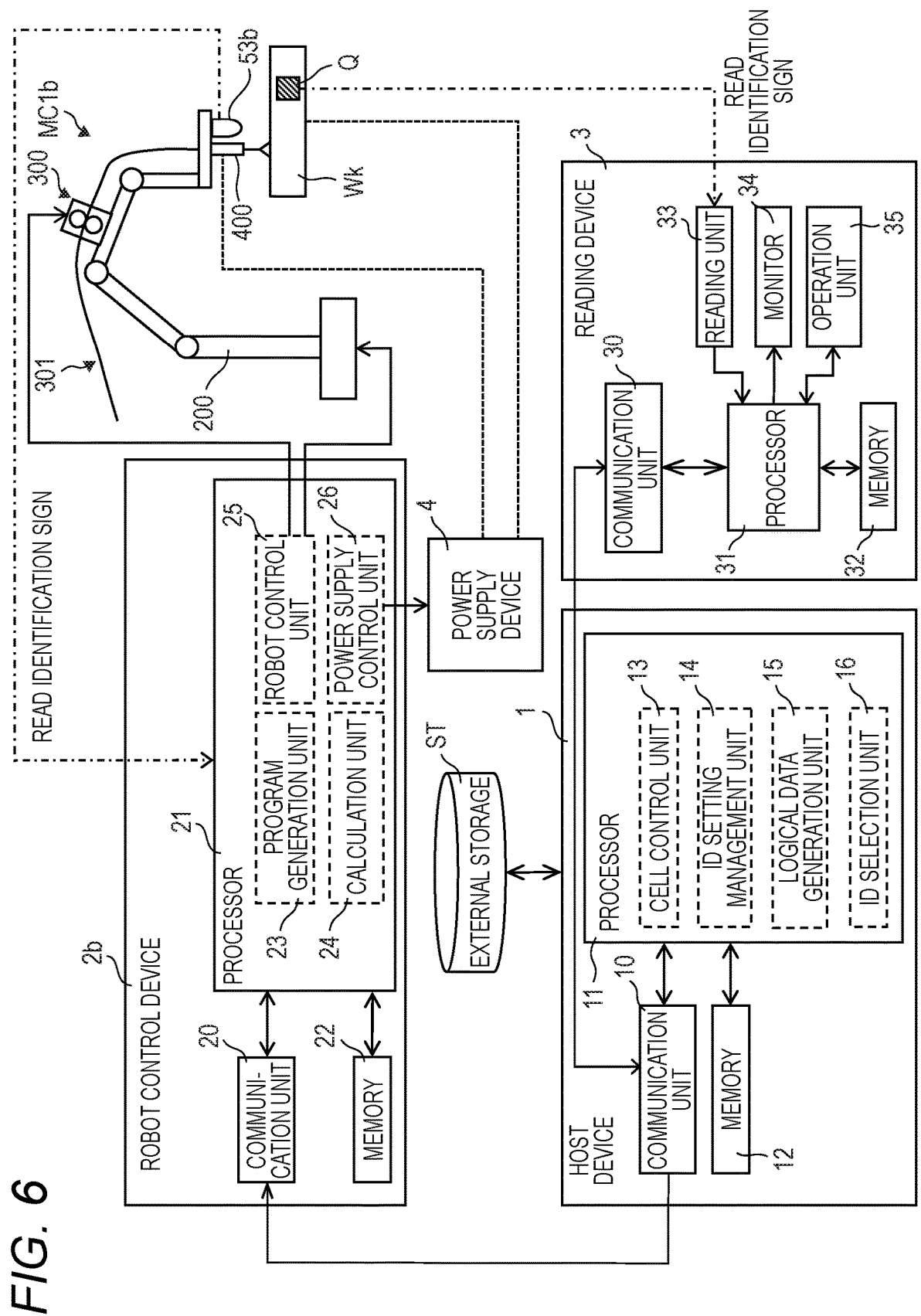
FIG. 6 is a diagram showing an internal configuration example of a host device and a robot control device according to a second embodiment.

FIG. 6 is a diagram showing an internal configuration example of the host device 1 and the robot control device 2b according to the second embodiment. The welding system 100 according to the second embodiment has substantially the same configuration as the welding system 100 according to the first embodiment. Therefore, the same components as those of the first embodiment are denoted by the same reference numerals, and a description thereof will be omitted. In the description of FIG. 6, in order to make the description easy to understand, illustration of the monitor MN1 and the input interface UI1 is omitted, the main welding robot MC1b among the main welding robots MC1a, MC1b, and so on is exemplified, and further, the robot control device 2b among the robot control devices 2a, 2b, and so on is exemplified and described.

In the welding system 100 according to the second embodiment, the robot control device and the main welding robot having the function of reading the identification sign may be a part of the robot control device and the main welding robot selected by the user business operator. That is, in the welding system 100 according to the second embodiment, all of the robot control devices 2a, 2b, and so on and the main welding robots MC1a, MC1b, and so on do not have to have the function of reading the identification sign.

The main welding robot MC1b executes the welding process and the reading of the identification sign Q instructed from the host device 1 under the control of the robot control device 2b. Before the welding process, the main welding robot MC1b executes reading of the identification sign Q assigned to each of the plurality of original workpieces using a reading unit 33b, and transmits information on the read identification sign Q to the robot control device 2b. After reading the identification sign Q, the main welding robot MC1b proceeds to the welding process, and performs, for example, arc welding in the welding process. The main welding robot MC1b may perform welding (for example, laser welding) other than the arc welding.

The manipulator 200 includes an articulated arm, and moves each arm based on a control signal from the robot control unit 25 of the robot control device 2b. Accordingly, the manipulator 200 can change the positional relationship between the reading unit 33b and the identification sign Q assigned to the workpiece Wk and the positional relationship between the workpiece Wk and the welding torch 400 by the movement of the arm.

The host device 1 generates an execution command for executing reading of the identification sign Q of each of the plurality of original workpieces based on the position information on the identification sign Q assigned to each of the plurality of original workpieces used in the welding process, and transmits the execution command to the robot control device 2b. The host device 1 generates a welding process execution command using each of the plurality of original workpieces by using the welding-related information input or set in advance by the user business operator, and transmits the execution command to the robot control device 2b.

The processor 11 in the host device 1 according to the second embodiment refers to the external storage ST based on a reading result of the identification sign Q read by the reading unit 33b, and acquires the information on the ID of the workpiece to which the read identification sign Q is assigned. The processor 11 outputs the acquired workpiece ID to the monitor MN1. The processor 11 may transmit the acquired workpiece ID to the reading device 3 and cause the reading device 3 to display the acquired workpiece ID.

The reading unit 33b includes, for example, a camera for reading a two-dimensional barcode or a laser for reading a barcode. The reading unit 33b reads the identification sign Q assigned to the workpiece, and outputs information (data) read from the identification sign Q to the processor 21.

As described above, the welding system 100 according to the second embodiment can not only read the identification sign Q using the reading device 3 but also read the identification sign Q using the main welding robot MC1b. Accordingly, the welding system 100 according to the second embodiment can read the IDs of a plurality of original workpieces or welded workpieces from the identification sign Q assigned to the workpiece Wk, for example, before, after, or both before and after the welding process, can display the read IDs of the workpieces on the reading device 3 owned by the user business operator, and can more efficiently read the IDs of the workpieces.

Since the ID of the workpiece can be read by the robot control device 2b and the reading device 3, the user business operator can select which of the robot control device 2b and the reading device 3 reads the ID of the workpiece in accordance with a production process of the welded workpiece, such as a case where there are a plurality of welding processes or a case where the welding process is executed in a different cell. Specifically, for example, in the sequence diagram shown in FIG. 5, the user business operator can execute reading of the identification sign in the processing of step St3 before the execution of the welding process by the robot control device 2b, and can execute reading of the identification sign in the processing of step St14 after the execution of the welding process by the reading device 3.

Although the various embodiments are described above with reference to the drawings, it is needless to say that the present disclosure is not limited to such examples. It will be apparent to those skilled in the art that various alterations, modifications, substitutions, additions, deletions, and equivalents can be conceived within the scope of the claims, and it should be understood that such changes also belong to the technical scope of the present disclosure. Further, components in the various embodiments described above may be combined optionally in the range without deviating from the spirit of the invention.

The present application is based on Japanese Patent Application (Japanese Patent Application No. 2019-188155) filed on Oct. 11, 2019, and contents thereof are incorporated herein by reference.

The present disclosure is useful as an information presentation method that supports more efficient management of an identifier of a workpiece produced in a process such as welding.

The invention claimed is:

1. An information presentation method of an identifier managed by a welding system, the information presentation method comprising:
   selecting, from information on identifiers assigned to a plurality of original workpieces each having an identification sign, one of the identifiers as an identifier of a welded workpiece produced by welding the plurality of original workpieces, the one of the identifiers selected as the identifier of the welded workpiece being designated as readable;
   welding the plurality of original workpieces together to form the welded workpiece, the welded workpiece having the identification signs of the plurality of original workpieces; and after the selecting, reading with a reading device one of the identification signs, outputting an alert when the read identification sign corresponds to the identifier that has not been designated as readable, and presenting the information on the identifier when the read identification sign corresponds to the identifier that has been designated as readable.

2. The information presentation method according to claim 1,
wherein the reading of the one of the identification signs is performed before execution of the welding.

3. The information presentation method according to claim 2,
wherein the alert comprises information indicating that the read identifier has not been designated as readable after the welding.

4. The information presentation method according to claim 1,
wherein the reading of the one of the identification signs is performed after execution of the welding.

5. The information presentation method according to claim 4,
wherein the alert comprises information indicating that the read identifier has not been designated as readable during the welding.

6. The information presentation method according to claim 4,
wherein the alert comprises position information on the identifier that has been designated as readable.

* * * * *